July 10, 1951 H. B. PULLAR 2,559,899
APPARATUS FOR TREATING SOLIDS AND/OR LIQUIDS
Original Filed Dec. 22, 1945 5 Sheets-Sheet 1
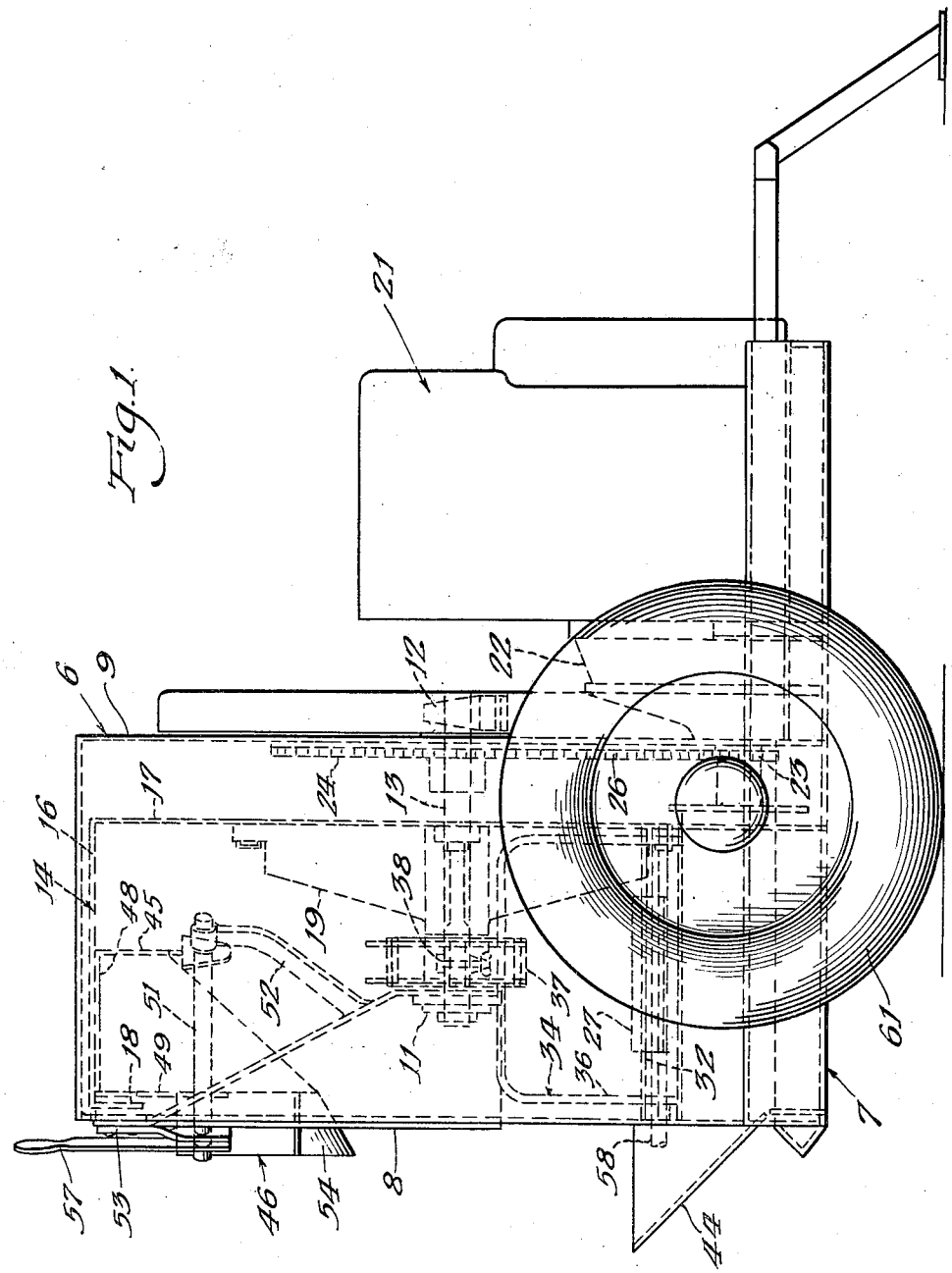
Inventor:
Harold B. Pullar
By Lee J. Gary
Attorney

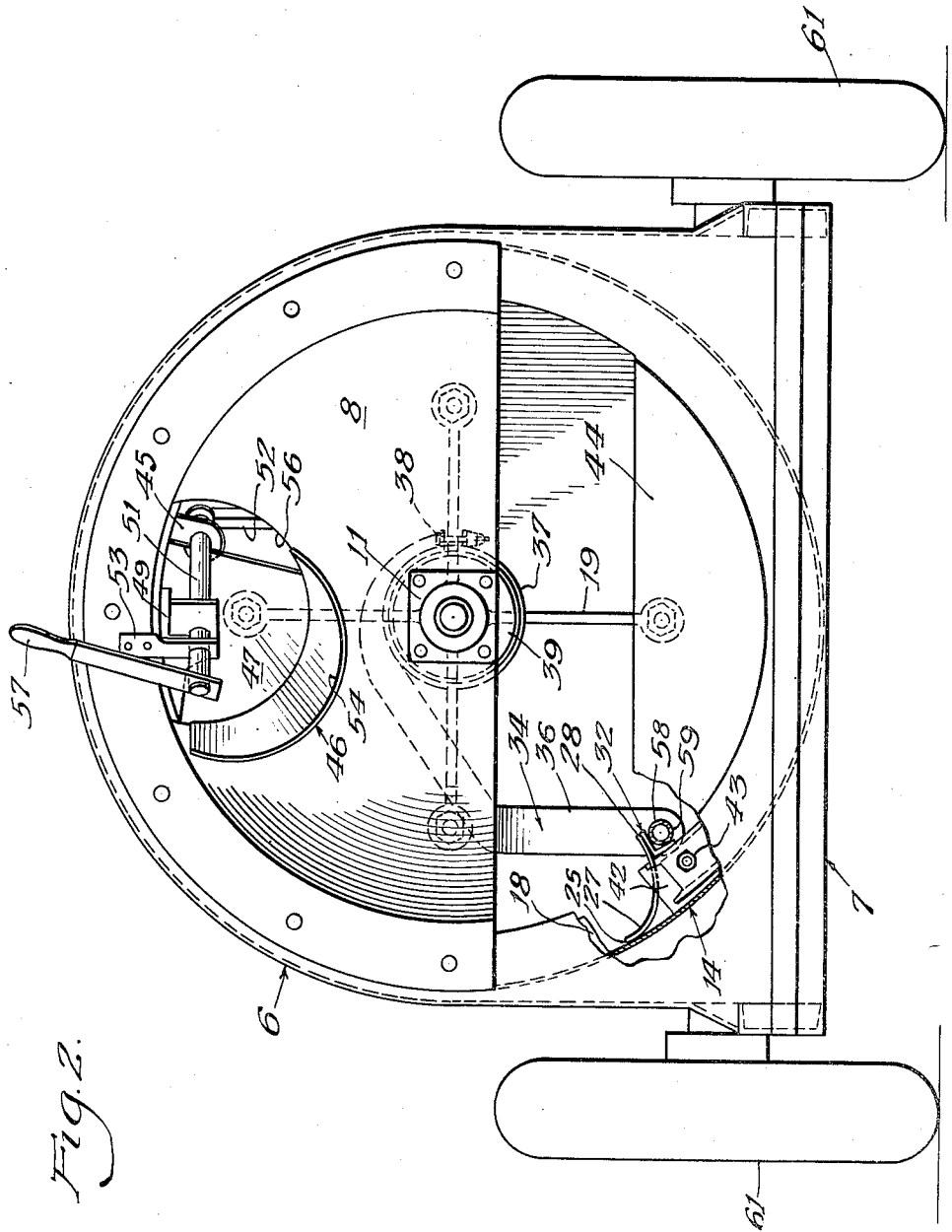

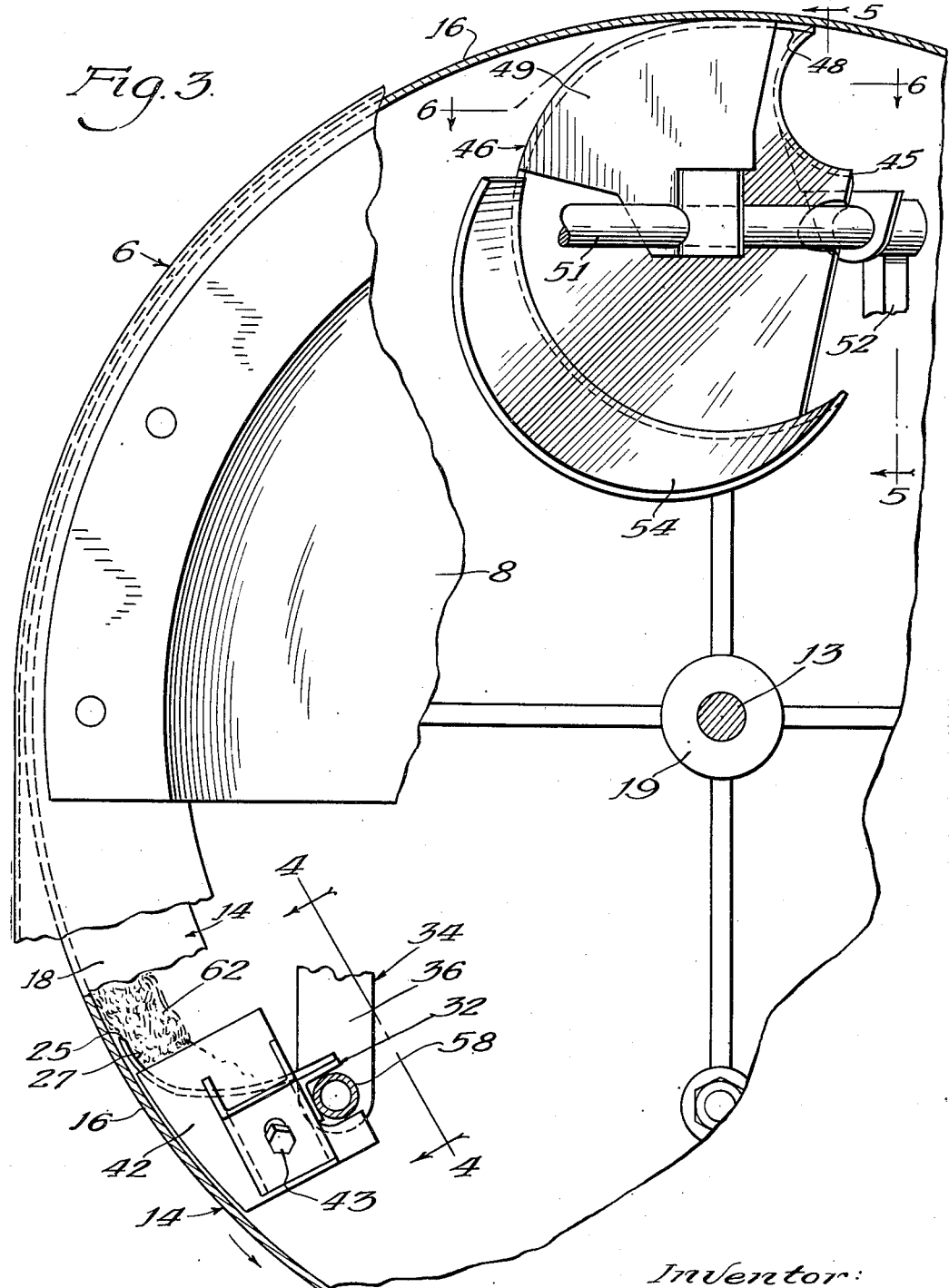

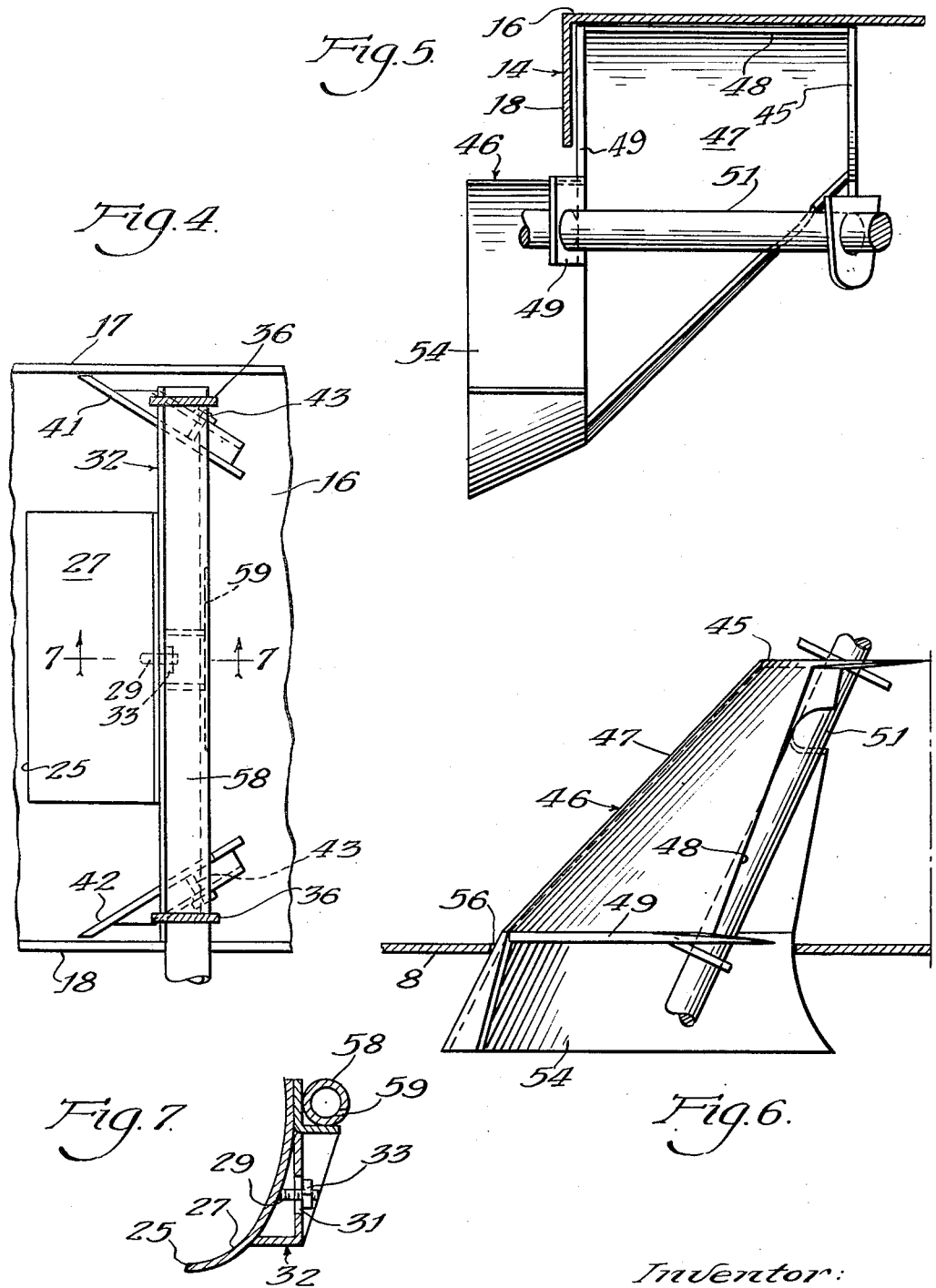

July 10, 1951 H. B. PULLAR 2,559,899
APPARATUS FOR TREATING SOLIDS AND/OR LIQUIDS
Original Filed Dec. 22, 1945 5 Sheets-Sheet 5

Inventor:
Harold B. Pullar
By: Lee J. Gary
Attorney

Patented July 10, 1951

2,559,899

UNITED STATES PATENT OFFICE 2,559,899

APPARATUS FOR TREATING SOLIDS AND/OR LIQUIDS

Harold B. Pullar, Chicago, Ill., assignor to The Kinetic Mixer Company, Inc., Chicago, Ill., a corporation of Illinois Continuation of application Serial No. 636,869, December 22, 1945. This application July 24, 1947, Serial No. 763,380

7 Claims. (Cl. 259—161)

This is a continuation of my abandoned application for patent, Serial Number 636,869, filed December 22, 1945, and relates to improvements in methods and apparatus for treating solids and/or liquids and is more particularly concerned with methods and apparatus for mixing, distributing, pulverizing, dissolving, mulling, dispersing, or aerating various materials in a more uniform and effective manner and within a shorter period of time than such treatment has been effected by other methods and apparatus heretofore known to me.

Briefly, this invention relates to improvements in methods and apparatus wherein the material to be treated is subjected to centrifugal force to form same into an annular rotating mass, after which the movement of the material is suddenly arrested to set up a progressively increasing pressure at a predetermined point within the annular mass whereby the kinetic energy of the moving mass is converted into effective work for accomplishing the desired treatment of the material.

While the methods and apparatus hereinafter described are suitable for various treatments of solids and/or liquids, this invention is more particularly concerned with the provision of improved methods and apparatus for effectively and uniformly coating mineral aggregate with an asphaltic binding material to form a paving composition suitable for use in roadway construction. In forming asphaltic paving compositions, it is essential that all surfaces of the aggregate are uniformly impregnated and coated with the asphaltic binder to insure that the resultant roadway shall be waterproof and have good wear resistant properties capable of withstanding the effects of traffic.

Asphaltic paving compositions have heretofore been formed by means of rotating shaft pug-mill, paddle, or ribbon flight mixers which operate on a wiping principle to provide a downward or pressure stroke, and an upward or fluffing stroke. It is well known to those skilled in this art that the use of these mixers for mixing asphaltic paving compositions results in a relatively slow and expensive process and sometimes causes "balling." It will be understood that when asphaltic paving compositions become "bally" within the apparatus, the composition is undesirable for use in paving roadways. In the production of asphaltic paving compositions according to the present invention, the mineral aggregate and asphaltic binder are distributed against the wall of a rotating receptacle in the form of an annular rotating mass by means of centrifugal force to prevent any "rolling" or "fluffing" to prevent "balling."

During rotational movement of the receptacle and its content of aggregate and asphaltic binder, the stream-like movement of a portion of the mass of aggregate and binder is abruptly arrested and its direction changed to a substantially radial movement by means of an arcuate-shaped arresting blade disposed substantially centrally of the rotating mass, the blade being formed to set up a progressively increasing pressure within the mass being treated whereby the kinetic energy of rotation of the stream-like moving mass is employed for effectively and uniformly impregnating and coating the aggregate with the asphaltic binder.

Simultaneously, the remaining portion of the rotating mass passes over side deflector plates which flank the central arresting blade, one on each side of the arresting blade, which divert the side portions of the rotating mass. A portion of the side portion of the mass is directed to the center and hence passes over the arresting blade, and a portion thereof which does not pass over the arresting blade passes over the deflector plates and is given an impetus toward the center of the stream beneath the mass which passes over the arresting blade. Thus, the side streams which pass over the deflector plates are, in effect, folded under that portion of the mass which passes over the arresting blade. Hence, in addition to a radial diversion of a portion of the mass, a transverse diversion of another portion of the mass occurs, the radially diverted and transversely diverted masses subsequently merging to form a rotating mass which cyclically is again passed over the arresting blade and deflector plates.

This invention further contemplates the provision of an improved batch type of apparatus for treating predetermined quantities of material, and embodying improved means for discharging the material from the apparatus at the completion of the treating operation.

This invention further contemplates the provision of an apparatus embodying features of this invention wherein a continuous flow of material to be treated is supplied to and automatically discharged therefrom at the completion of the treating operation.

This invention embodies other novel features, details of construction, and arrangement of parts, which are hereinafter set forth in the specification and claims and illustrated in the accompanying drawings wherein:

Fig. 1 is a side elevational view showing a batch type apparatus embodying features of this invention.

Fig. 2 is a front elevational view of same.

Fig. 3 is an enlarged fragmentary front elevational view, partly in section, showing the means employed for treating material and for discharging the treated material from the apparatus.

Fig. 4 is a detail sectional view taken along the line 4—4 of Fig. 3, showing the means for treating the material.

Fig. 5 is a detail sectional view taken along the line 5—5 of Fig. 3, showing the material discharge means.

Fig. 6 is a detail sectional view taken along the line 6—6 of Fig. 3.

Fig. 7 is a sectional view taken along the line 7—7 of Fig. 4.

Figure 8:
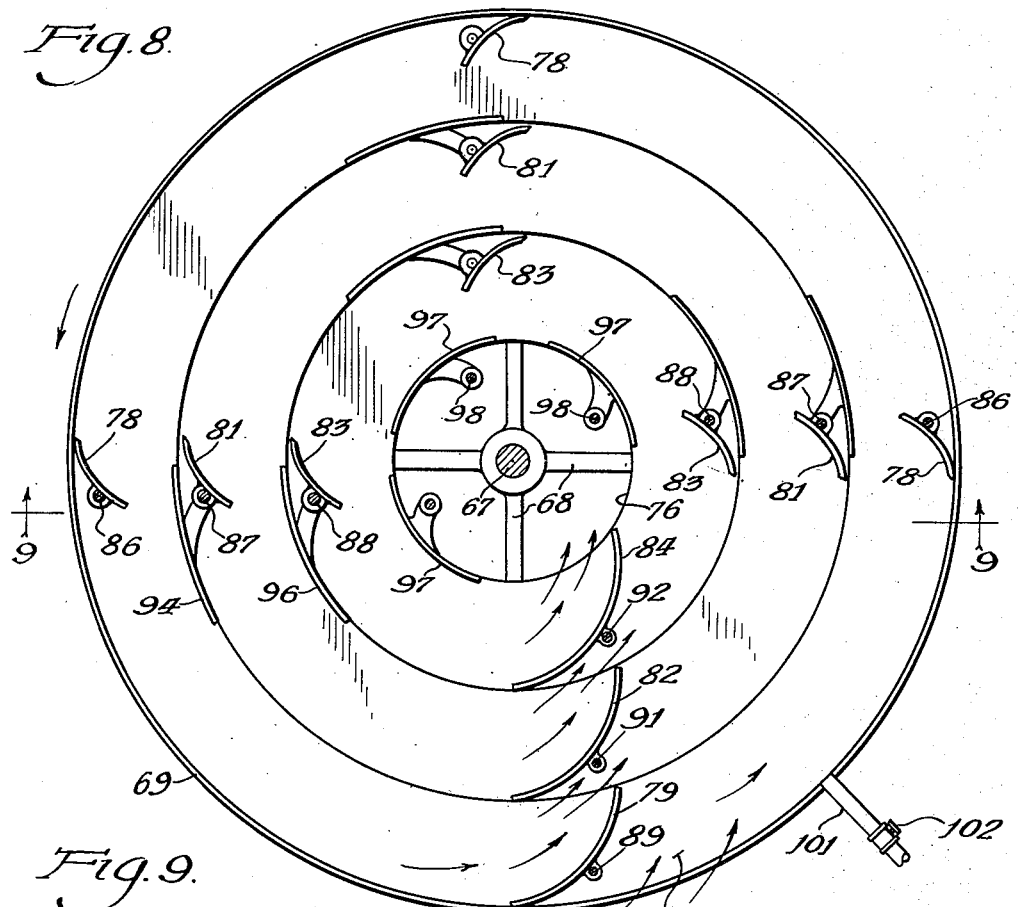
Fig. 8 is a sectional view taken along the line 8—8 of Fig. 9, showing a modified form of apparatus for the continuous treatment of materials.

Referring now to the drawings and more particularly to Figs. 1 to 7, a batch type apparatus embodying features of this invention is shown as comprising a housing 6 mounted upon a suitable frame which is generally indicated at 7 and formed of suitable structural members, such as channels and angle iron welded or bolted together. The housing 6 is provided with a front wall 8 and a rear wall 9 provided with bearings 11 and 12, respectively, to receive a shaft 13.

A cylindrical receptacle 14 formed with an annular wall 16, a back wall 17 and a front flange portion 18 is mounted on the shaft 13 by means of a ribbed supporting member 19. The member 19 is keyed to the shaft 13 and the latter is adapted to be rotated by means of a suitable source of power, such as an electric motor or internal combustion engine indicated generally at 21. The motor 21 is secured to the frame 7 and is operatively connected for driving engagement with the shaft 13 through a variable speed transmission 22 which may be of any well known type. The transmission 22 is provided with a driving sprocket 23 for driving engagement with a driven sprocket 24 by means of a sprocket chain 26.

An arresting blade 27 having an arcuate working face is disposed on the downwardly moving side of the receptacle 14 and below its horizontal axis in order that a portion of the material being treated may fall by gravity over the rear edge 28 of the blade and thence downwardly upon the annular wall 16 of the receptacle. As illustrated in Fig. 7 the arresting blade 27 is provided with a threaded bolt 29 for insertion through an opening 31 provided in a supporting bracket 32. The opening 31 is preferably in the form of a slot to permit adjustment of the arresting blade 27 with respect to the inner surface of the annular wall 16 of the receptacle 14. Preferably the blade 27 is adjusted in slightly spaced relationship to the annular wall 16, as shown best in Fig. 3, so that a relatively thin layer of the material being treated will pass beneath the blade and thus prevent excessive wear from occurring between the blade and the wall 16. After the arresting blade has been adjusted, it is secured in position by means of a nut 33 threaded onto the bolt 29.

The supporting bracket 32 is secured to a yoke 34 comprising a pair of arms 36 disposed in spaced relation for welded engagement to opposite ends of the supporting bracket 32. The inner end of the yoke 34 is welded to a split sleeve 37 provided with a bolt 38 for decreasing the diameter of the split sleeve 37 for clamping engagement around a cylindrical supporting bearing 39 welded to the front plate 8. By loosening the bolt 38, it will be noted that the position of the arresting blade 27 may be adjusted with respect to the axis of the receptacle 14. A pair of side deflector plates 41 and 42 are also detachably secured to the supporting frame 32 by means of bolts 43, and disposed to deflect a portion of the material being treated inwardly from the back wall 17 and front flange of the receptacle 14. A portion of the material so deflected passes over the arresting blade 27 and a portion thereof passes over the top of the deflector blades, but is given an impetus toward the center on the downward side of the arresting blade.

A delivery chute 44 is mounted on the front side of the casing 6 to receive the material being treated and to deliver same to the interior of the receptacle 14. After treatment, the material is discharged from the receptacle 14 by means of a discharge device which is generally indicated at 46. The discharge device comprises a substantially frustro-conical scoop portion 47 having a forward edge 48 disposed for movement into and out of discharge position with respect to the inner surface of the annular wall 16 of the receptacle 14. The scoop portion 47 is provided with an inner wall 45 and an outer wall 49 for welded engagement to a shaft 51 journaled in bearings 52 and 53 secured to the front wall 8 of the casing 6. The scoop portion 47 of the discharge device is disposed within the receptacle 14 and provided with a skirt 54 to extend outwardly through an opening 56 formed in the front wall 8. It will be noted that the skirt 54 is disposed to receive material from the scoop portion 47 when the forward edge 48 is disposed adjacent the annular wall 16 of the receptacle 14. An operating handle 57 is secured to the outer end of the shaft 51 for manually moving the forward edge 48 of the discharge device 46 into and out of operative engagement with respect to the annular wall 16 of the receptacle 14.

A pipe 58 is provided to extend along the supporting frame 32 behind the arresting blade 27 for spraying fluid through a slot 59 to the interior of the receptacle 14. The fluid is supplied to the pipe 58 under pressure from a pump (not shown). To facilitate movement of this batch type apparatus to different locations, a pair of wheels 61 are journaled to opposite sides of the frame 7.

A batch of material to be treated, such as mineral aggregate and asphaltic binder for same is directed into the interior of the receptacle 14 by means of the chute 44. During rotational movement of the receptacle in a counterclockwise direction, as indicated by the arrow in Fig. 2, the material to be treated is distributed around the annular wall 16 by centrifugal force. The mass of the material thus assumes the form of an annular moving stream 62 having a velocity of from between approximately 8 feet per second to approximately 32 feet per second. During rotation of the receptacle 14, a portion of the annular revolving stream of material 62 is treated by engagement with the arcuate working face of the arresting blade 27. The working face of the blade 27 is preferably formed with a variable curvature that will cause progressively increasing resistance through the passage of material being treated thereby and it will be noted that the leading edge portion 25 thereof is substantially tangent to the annular stream of material and that the trailing edge thereof curves inwardly toward a plane substantially normal to the flow of the annular stream of material.

The working face of the arresting blade 27 is formed in the manner illustrated and described for the purpose of converting the kinetic energy of the mass 62 into effective work of treatment, such as impregnating and coating the mineral aggregate with an asphaltic binder. It will further be noted that the working face of the arresting blade 27 is shaped to create strain within, and cause considerable shear between laminar elements of the rotating annular mass of material, thereby effecting a substantial conversion of the kinetic energy therein into effective work of treatment. Simultaneously with the passage of a portion of the rotating mass over the arresting blade, a portion of the rotating mass passes over the top of each deflector plate 41 and 42. In passing over the trailing edge of the arrester blade a substantial void is established immediately behind said blade. The portion of the mass passing over the tops of the deflector plates is given an inward impetus and said mass moves into the void behind the arrester blade and thus forms a furrow to the center. The mass passing over the arrester blade then drops upon said furrow and shortly thereafter the mass flattens out under the influence of the centrifugal force and continues its rotation for another cyclic treatment.

If liquid asphalt or other liquid binder is to be mixed with the mass during the treating operation, it may be sprayed through the slot 59 and thus discharges into the void, hereinbefore described and consequently disposes itself uniformly between the transversely diverted mass and the mass passing over the arrester blade.

The approximate thickness of the annular mass of material 62 with respect to the size and shape of the arresting blade 27 is illustrated in Fig. 3. In the treatment of asphaltic paving compositions, it is essential for the most effective treatment that this ratio in height of the mass of material and the arresting blade 27 be maintained to prevent the formation of "balls." During the treatment of the materials, the linear speed of the mass 62 must be sufficient to maintain the mass against the annular wall 16 of the receptacle by centrifugal force. The working face of the arresting blade 27 should be formed and disposed to convert substantially all of the kinetic energy of the moving mass 62 which passes over the arrester blade into effective work of treatment of the materials, and this is especially true when the apparatus is employed in impregnating and coating mineral aggregate with an asphaltic binder.

In the use of the batch type apparatus shown and described for impregnating and coating mineral aggregate with an asphaltic binder, it has been found that the aggregate is uniformly impregnated and coated with the binder in less than 35 passages of the annular mass 62 over the working face of the arresting blade 27, thereby effecting a great saving in labor, time and power consumption over other forms of apparatus heretofore employed for producing asphaltic paving compositions. After the material has been treated, it is removed from the receptacle 14 by moving the discharge device 46 in a clockwise direction by means of the operating handle 57. The leading edge 49 of the body portion 47 is thus moved to an unloading position adjacent the inner surface of the annular wall 16. When the unloading device 46 is thus positioned, the material is directed into the body portion 47 and thence outwardly over the skirt portion 54 into a suitable receptacle (not shown).

Figure 9:
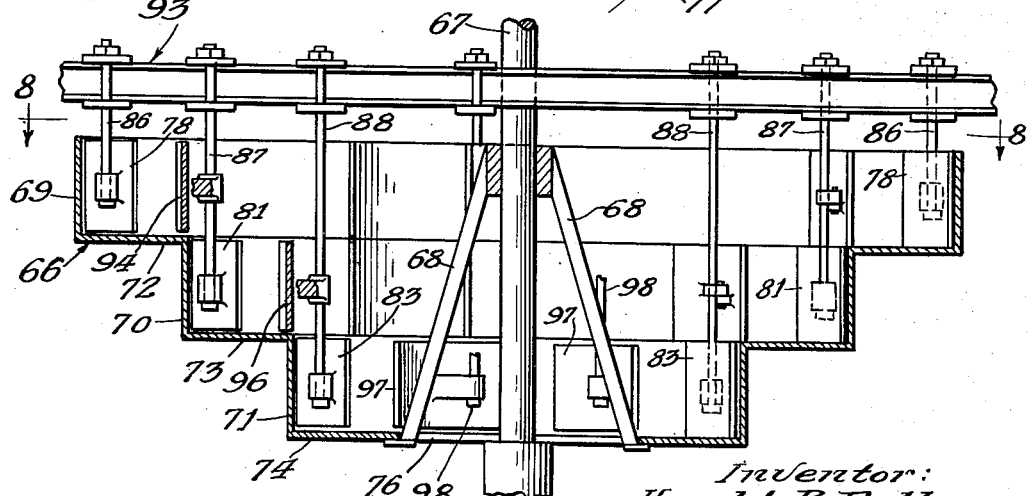
Fig. 9 is a sectional view taken along the line 9—9 of Fig. 8.

Figs. 8 and 9 illustrate a modified form of apparatus adapted for use in the continous processing of materials. In this form of the invention, a receptacle 66 is mounted for rotational movement upon a vertically disposed shaft 67 by means of a supporting bracket 68. The receptacle 66 is formed with a plurality of annular walls 69, 70, and 71 which are connected by intermediate walls 72 and 73. The annular wall 71 terminates at a bottom wall 74 which is provided with a discharge opening 76.

Material to be treated, such as bituminous paving compositions, is continuously delivered to the receptacle 66 onto the horizontally disposed connecting plate 72 at 77. The receptacle 66 is continuously rotated in a counterclockwise direction, as illustrated in Fig. 8, to bring material into engagement with a plurality of arresting blades 78 disposed adjacent the annular wall 69 for converting the kinetic energy of the moving annular mass into effective work of treatment of the material, as heretofore set forth in connection with the form of an apparatus illustrated in Figs. 1 through 7. After the material has been directed over the several arresting blades 78, it is directed inwardly by means of a deflector blade 79 to transfer the material onto the intermediate wall 73, as indicated by the arrows. The material is treated in this intermediate stage of the apparatus by means of the arresting blades 81, and then the material is diverted downwardly onto the bottom wall 74 of the receptacle by means of the deflector blade 82. In the third stage of the receptacle, material is treated by means of the arresting blades 83 and then diverted outwardly through the discharge opening 76 by means of a deflector blade 84 provided at the bottom wall 74.

The arresting blades 78, 81 and 83 are mounted upon vertically disposed shafts 86, 87 and 88, respectively, and the deflector blades 79, 82 and 84 are mounted upon vertically disposed shafts 89, 91 and 92, respectively. The upper ends of the supporting shafts for the arresting blades and deflector blades are secured to a suitable framework 93 positioned above the receptacle 66. The shafts 87 and 88 also support plates 94 and 96 disposed to prevent the passage of material from an upper stage to a lower stage during treatment by the arresting blades 78 and 81. A plurality of plates 97 are mounted on supporting shafts 98 adjacent each of the arresting blades 83 to prevent passage of material being treated from the third stage through the discharge opening 76.

While the continuous process type apparatus thus shown and described embodies three stages of treatment for the material during its passage through the receptacle 66, it is contemplated that the number of stages provided in the receptacle may be varied depending upon the type of material being treated, the diameter of the receptacle, and the number of arresting blades provided for each stage of treatment. This continuous process type of apparatus is particularly suitable for use in coating mineral aggregate with an asphaltic binder for paving roadways as a continuous flow of aggregate may be delivered to the receptacle 66 and the asphaltic binder may be delivered to the receptacle through a supply conduit 101 controlled by a valve 102. After a mineral aggregate has been uniformly impregnated and coated with the asphaltic binder, it may be delivered and distributed directly onto a roadway.

Although my invention has been shown and described in conjunction with a counterclockwise moving mass rotating about a horizontal axis, it is to be understood that it may also be employed with a clockwise moving mass rotating about a horizontal axis, in which case the diversion hereinbefore described will occur in substantially the central portion of the fourth quadrant instead of in the substantially central portion of the third quadrant as hereinbefore described.

While this invention has been shown in but two forms, it is obvious to those skilled in the art that it is not so limited but is susceptible of various changes and modifications without departing from the spirit and scope of the claimed invention.

I claim as my invention:

1. In an apparatus adapted for uniformly and effectively impregnating and coating road aggregate materials with an asphaltic binder, a cylindrical receptacle journaled for rotational movement about a horizontal axis for forming said materials and binder into an annular revolving mass, and an arcuate arresting blade disposed below the horizontal axis of the receptacle adjacent its downwardly moving side for suddenly arresting the travel of said mass to convert the kinetic energy therein into effective work of impregnating and coating the aggregate materials with said binder.

2. In an apparatus adapted for uniformly and effectively impregnating and coating road aggregate materials with an asphaltic binder, a cylindrical receptacle journaled for rotational movement about a horizontal axis for forming said materials and binder into an annular revolving mass, an arcuate arresting blade disposed below the horizontal axis of the receptacle adjacent its downwardly moving side for suddenly arresting the travel of said mass to convert the kinetic energy therein into effective work of impregnating and coating the aggregate materials with said binder, said blade extending from a plane substantially tangent to the annular mass to a plane substantially normal thereto.

3. In an apparatus adapted for uniformly and effectively impregnating and coating road aggregate materials with an asphaltic binder, a cylindrical receptacle journaled for rotational movement about a horizontal axis for forming said materials and binder into an annular revolving mass, an arcuate arresting blade disposed below the horizontal axis of the receptacle adjacent its downwardly moving side for suddenly arresting the travel of said mass to convert the kinetic energy therein into effective work of impregnating and coating the aggregate materials with said binder, said blade extending from a plane substantially tangent to the annular mass to a plane substantially normal thereto, and a material discharge blade journaled for movement relative to said receptacle for deflecting the material therefrom, said blade being disposed adjacent the upper portion of said receptacle.

4. An apparatus for mixing materials which comprises a substantially cylindrical drum for carrying said materials, said drum being rotated whereby said materials are carried as an annular mass upon the moving inner cylindrical surface of the drum, stationary arresting means positioned in said drum adjacent the central portion of the inner cylindrical surface of said drum, said arresting means being curved radially inwardly to abruptly change the direction of travel of a portion of said annular mass from circular to radial inwardly, stationary deflecting means positioned within said drum laterally adjacent said arresting means to divert a portion of the annular mass laterally inwardly whereby said radially directed portion of the mass and the laterally diverted portion of the mass are superimposed upon the inner drum surface.

5. An apparatus for mixing materials which comprises a substantially cylindrical drum for carrying said materials, said drum being rotated whereby said materials are carried as an annular mass upon the moving inner cylindrical surface of the drum, stationary arresting means positioned in said drum adjacent the central portion of the inner cylindrical surface of said drum to abruptly change the direction of travel of a portion of said moving annular mass from circular to radial inwardly, stationary deflecting means positioned within said drum laterally adjacent opposite sides of said arresting means to divert a portion of the moving annular mass laterally inwardly whereby said radially directed portion of the mass and the laterally diverted portion of the mass are superimposed upon the inner drum surface.

6. An apparatus for mixing materials which comprises a substantially cylindrical drum for carrying said materials, said drum being rotated about a substantially horizontal axis and whereby said materials are carried as a moving annular mass upon the moving inner cylindrical surface of the drum, stationary arresting means positioned in said drum adjacent the central portion of the inner cylindrical surface of said drum to abruptly change the direction of travel of a portion of said moving annular mass from circular to radial inwardly, stationary deflecting means positioned within said drum laterally adjacent said arresting means to divert a portion of the moving mass laterally inwardly, said deflecting means being positioned adjacent the downwardly moving side of said drum surface whereby the radially directed portion of the mass is superimposed upon the laterally diverted portion of the mass.

7. A method of mixing asphalt paving compositions including aggregate and an asphaltic binder, which comprises accelerating a mass of said material in a direction whereby it is assisted by gravity, abruptly changing the direction of motion of the central portion of said mass from its initial direction to a direction at substantially right angles to its original direction, diverting the remaining portion of said mass from the side portions of the accelerated mass laterally toward the projected path of movement of the central portion of the accelerated mass, and causing the central portion of the mass whose direction of motion was abruptly changed and the laterally diverted portions of the mass to merge.

HAROLD B. PULLAR.

REFERENCES CITED

The following references are of record in the file of this patent:

UNITED STATES PATENTS

| Number | Name | Date |
|---|---|---|
| 208,707 | Blackwell | Oct. 8, 1878 |
| 522,339 | Evenden | July 3, 1894 |
| 939,629 | Reed | Nov. 9, 1909 |
| 953,961 | Lancaster | Apr. 5, 1910 |
| 1,048,738 | Sanborn | Dec. 3, 1912 |
| 1,447,125 | Dunn et al. | Feb. 27, 1923 |
| 2,099,964 | Robbins | Nov. 23, 1937 |

FOREIGN PATENTS

| Number | Country | Date |
|---|---|---|
| 419,640 | France | Jan. 11, 1911 |